UNITED STATES PATENT OFFICE.

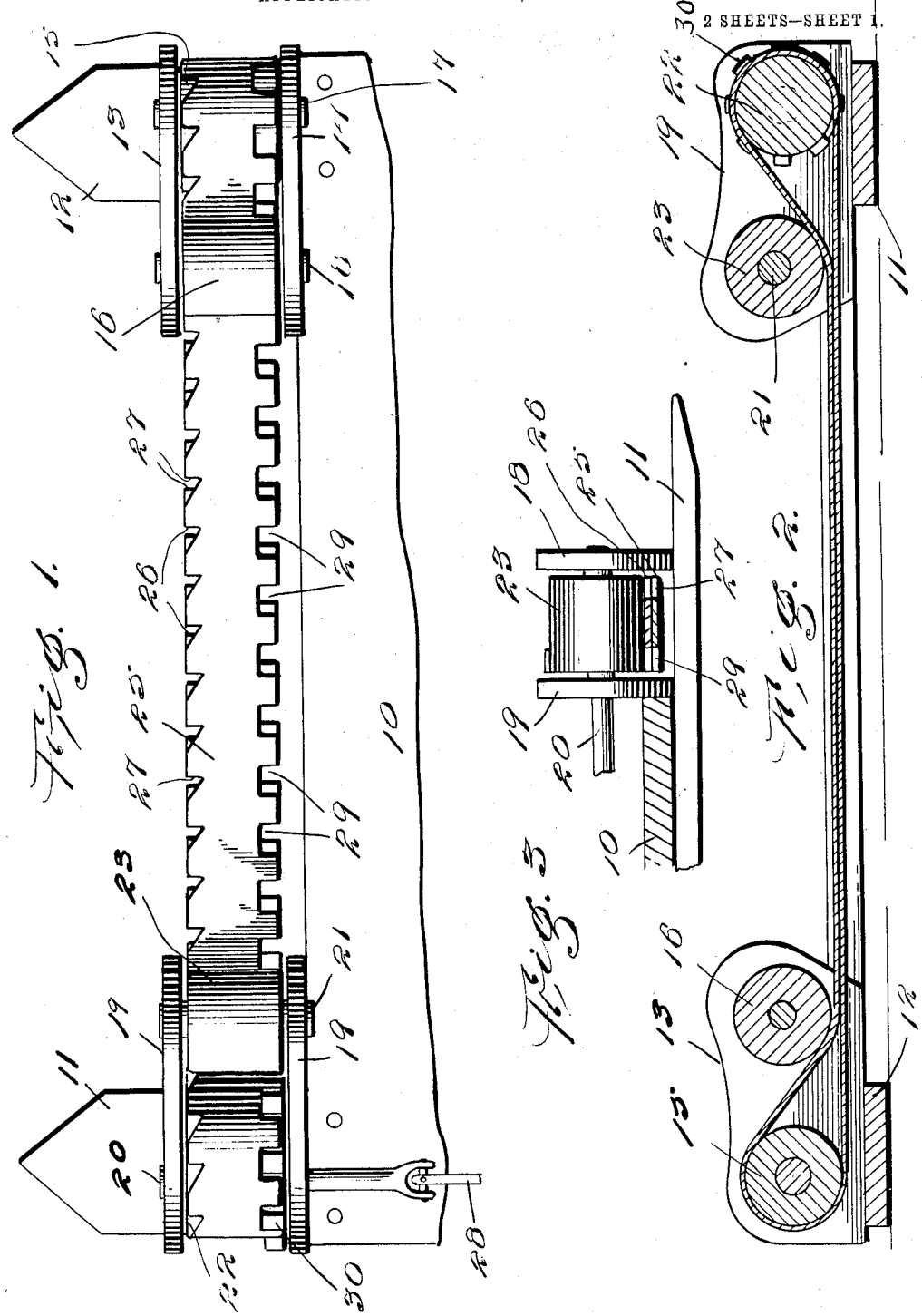

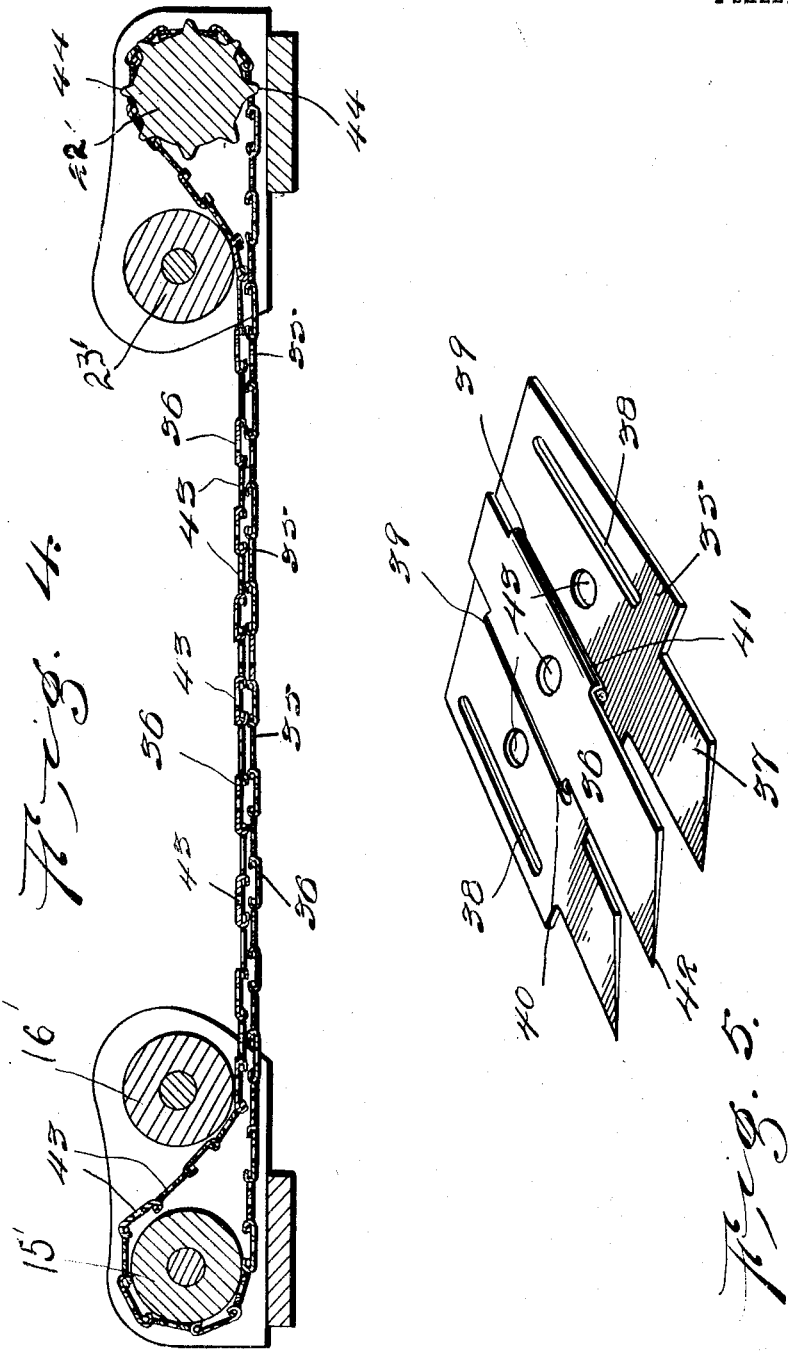

RODMAN W. HATHAWAY, OF CARBON, IOWA.

MOWER.

No. 845,547.    Specification of Letters Patent.    Patented Feb. 26, 1907.

Application filed March 7, 1904. Serial No. 197,027.

*To all whom it may concern:*

Be it known that I, RODMAN W. HATHAWAY, a citizen of the United States, residing at Carbon, in the county of Adams, State of Iowa, have invented certain new and useful Improvements in Mowers; and I do hereby declare the following to be a full, clear, and exact description of the invention, such as will enable others skilled in the art to which it appertains to make and use the same.

This invention relates to mowers, and more particularly to the cutting mechanism thereof, the object of the invention being to provide a construction wherein the knives will move continuously instead of having the usual reciprocating motion.

A further object of the invention is to provide a construction and arrangement which will provide for an upper and a lower series of knives, which will coöperate in the cutting operation, other objects and advantages of the invention having reference to details, which will be understood in the following description.

In the drawings forming a portion of this specification, and in which like numerals of reference indicate similar parts in the several views, Figure 1 is a top plan view showing a portion of a mower including one form of cutting mechanism. Fig. 2 is a longitudinal vertical section through the knife-band, including the carrying and guiding rolls. Fig. 3 is a vertical section at right angles to Fig. 2. Fig. 4 is a view similar to Fig. 2, embodying a knife-band comprising links. Fig. 5 is a detail perspective view showing a portion of a linked knife-band.

Referring now to the drawings, there is shown a portion of a mowing-machine comprising a bar 10, which corresponds to the ordinary finger-bar and at the inner and out ends of which are the shoes 11 and 12, which run upon the ground. Upon the shoe 12 in advance of the bar 10 are ears 13 and 14, which are spaced from each other and between which are disposed rollers 15 and 16, that are mounted upon shafts 17 and 18, secured in the ears. The lowermost point of the periphery of the roller or drum 15 is slightly lower than the corresponding portion of the roller or drum 16 for a purpose to be presently explained. Upon the shoe 11 and spaced forwardly and rearwardly thereof are the ears 19, in which are mounted shafts 20 and 21, on which are formed the rollers or drums 22 and 23, the lowermost point of the periphery of the drum 22 being slightly lower than the corresponding portion of the drum 23.

In connection with the structure above described there is employed a knife-belt 25, which is endless and which passes around the drums 22 and 15 and under the drums 23 and 16, the drums 23 and 16 serving to hold the upper portion of the intermediate part of the belt in close relation to the lower portion thereof. At the front edge of the belt 25 are formed teeth 26, each having a cutting edge 27, lying at right angles to the direction of travel of the belt upon the rollers or drums 22 and 15, this cutting edge being the front of the tooth. The back of the tooth is cut away to form the incline 27, that leads to the base of the front edge of the next tooth in the rear.

If the roller or drum 22 be rotated, the teeth of the upper and lower portions of the belt will travel in opposite directions and the cutting edges of the upper and lower teeth will engage between them the stalks to be cut and will cut them.

The shaft 20 of the drum 22 extends beyond the ear 19 and is connected with the tumbling-rod 28, that is operated from the ground-wheel of the mower. The rear edge of the knife-band is provided with notches 29, which are engaged by the teeth 30, formed upon the periphery of the rear end of the drum 22, so that as the drum is rotated the knife-band is moved to effect the cutting operation. In Figs. 4 and 5 of the drawings there is shown a construction wherein the knives are in the forms of pivotally-connected links instead of being parts of a single band. There is a series of links 35 and a series of links 36, the links of one series alternating with the other. The body of each of the links 35 is somewhat broader than the tooth 37, formed thereon, and adjacent to the side edges of this body portion are formed the slots 38 and 39, which extend longitudinally of said body portion and in which are engaged the hooked ears 40 and 41, respectively, formed at the sides of the body portion of the link 36, from which projects the tooth 42. These links 35 and 36, which connected to form an endless band, are mounted upon the drums 22' and 15', corresponding to the drums 22 and 15, and pass beneath the guide rollers or drums 23' and 16', so that the upper links of the band are held in close relation to the lower links. One of the edges of each of the teeth 37 and 42 are beveled, and these beveled edges are sharpened and form the cutting edges of the teeth. Through the body portion of each link is formed a perforation 43, which is arranged for engagement by a tooth 44 of the drum 22', so that by rotation of the latter the band will be moved to cause the teeth of the upper and lower links to move in opposition and cut the stalks against which the mower is moved.

What is claimed is—

1. A knife-band for mowers comprising alternating series of links, the links of each series having blades and having their body portions of greater width than the blades to form projecting portions, the extended portions of the links of one series being slotted and the extended portions of the links of the other series being curved downwardly and inwardly toward each other and engaged through the said slots.

2. A knife-band for mowers comprising alternating series of links, the links of one series being slotted adjacent their longitudinal edges, and the links of the other series being provided with overturned flanges for engagement in the slots in the links of the other series, the links of each series being provided with blades.

In testimony whereof I affix my signature in presence of two witnesses.

RODMAN W. HATHAWAY.

Witnesses:
FRED LEIPERT,
ALBERT CASSELL.